United States Patent
Kamel et al.

(10) Patent No.: US 7,265,293 B2
(45) Date of Patent: Sep. 4, 2007

(54) HOLDOUT DEVICES AND COVER ASSEMBLIES AND METHODS INCORPORATING THE SAME

(75) Inventors: Sherif I. Kamel, Cary, NC (US); Mahmoud K. Seraj, Apex, NC (US); George W. Pullium, III, Garner, NC (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 11/089,243

(22) Filed: Mar. 24, 2005

(65) Prior Publication Data

US 2006/0213678 A1 Sep. 28, 2006

(51) Int. Cl.
*H01B 7/00* (2006.01)
(52) U.S. Cl. .......................... 174/69; 174/73.1; 174/93
(58) Field of Classification Search .......... 174/DIG. 8, 174/DIG. 12, 93, 69, 73.1
See application file for complete search history.

(56) References Cited

U.S. PATENT DOCUMENTS

| | | | | |
|---|---|---|---|---|
| 3,357,457 | A | 12/1967 | Myer | 138/166 |
| 4,233,731 | A | 11/1980 | Clabburn et al. | 29/859 |
| 4,462,651 | A | 7/1984 | McGaffigan | 339/30 |
| 5,030,487 | A * | 7/1991 | Rosenzweig | 428/34.9 |
| 5,098,752 | A | 3/1992 | Chang et al. | 428/34.9 |
| 5,280,136 | A | 1/1994 | Yaworski et al. | 174/73.1 |
| 5,380,224 | A * | 1/1995 | DiCicco | 439/610 |
| 5,406,871 | A | 4/1995 | Lambert, Jr. | 138/103 |
| 5,495,650 | A | 3/1996 | Crepel et al. | |
| 5,670,223 | A | 9/1997 | Sadlo et al. | |
| 5,753,861 | A | 5/1998 | Hansen et al. | 174/93 |
| 5,925,427 | A | 7/1999 | Sadlo et al. | 428/34.1 |
| 5,944,929 | A | 8/1999 | Vallauri et al. | 156/162 |
| 6,245,999 | B1 | 6/2001 | Costigan et al. | 174/74 A |
| 6,444,913 | B1 | 9/2002 | Kao | 174/73.1 |
| 6,762,364 | B2 | 7/2004 | Hofmann et al. | 174/84 R |

FOREIGN PATENT DOCUMENTS

| | | |
|---|---|---|
| EP | 0399263 A2 | 11/1990 |
| EP | 0767523 A3 | 7/1997 |
| EP | 0767523 A2 | 9/1997 |
| WO | WO 91/16564 | 10/1991 |
| WO | WO 98/40941 A | 9/1998 |
| WO | WO 02/092328 A1 * | 11/2002 |

* cited by examiner

*Primary Examiner*—Jinhee Lee
(74) *Attorney, Agent, or Firm*—Myers Bigel Sibley & Sajovec, P.A.

(57) ABSTRACT

The resilient sleeve member defines an axially extending inner passage. The holdout device includes a core mounted in the inner passage of the sleeve member. The core defines a core passage to receive the elongate substrate and has at least first and second sections. The first and second sections are arranged in a supporting position such that the core maintains the sleeve member in a radially expanded condition. The first and second sections are arranged for relative telescoping movement from the supporting position to a releasing position to permit at least a portion of the sleeve member to radially contract from the radially expanded position to a radially recovered position.

28 Claims, 5 Drawing Sheets

Fig. 1
Fig. 2
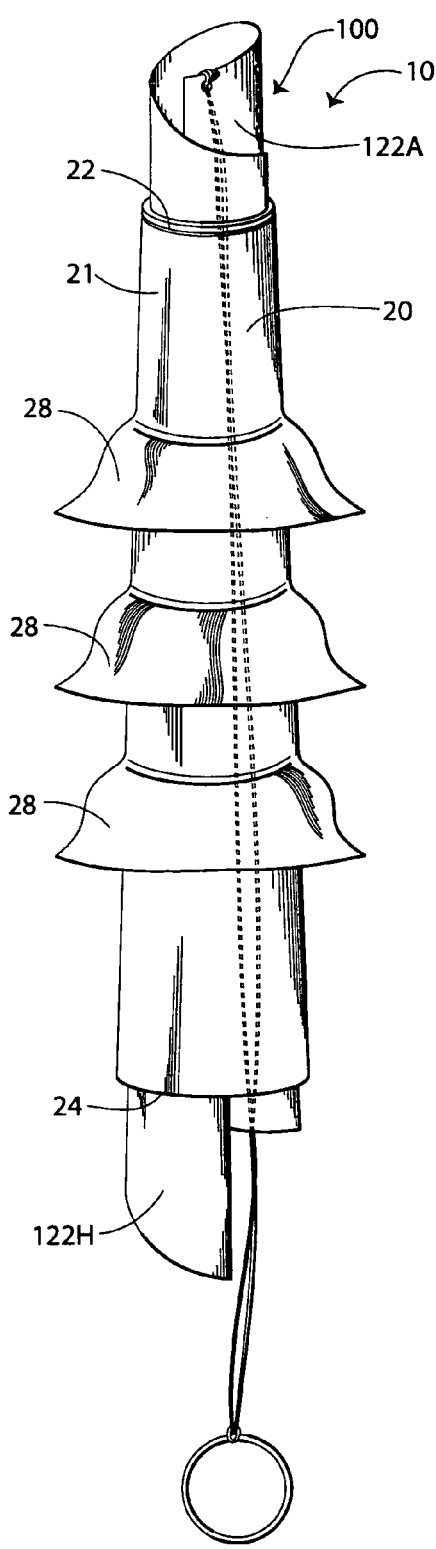
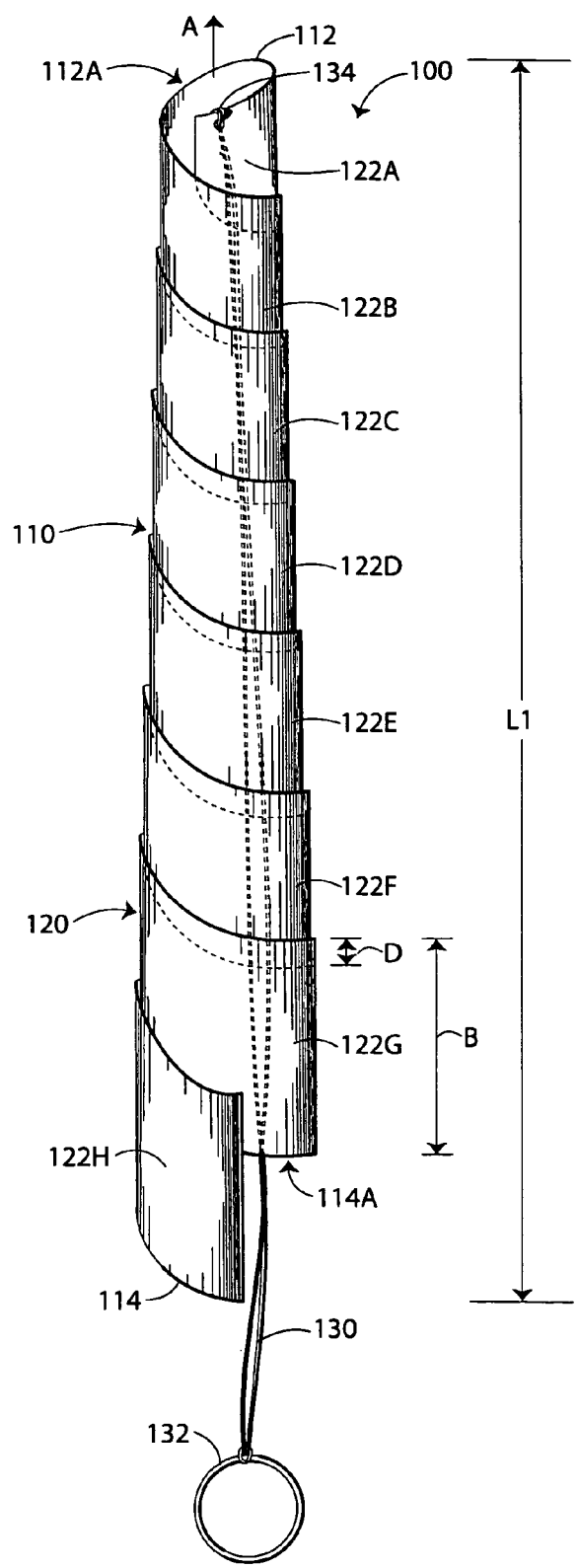

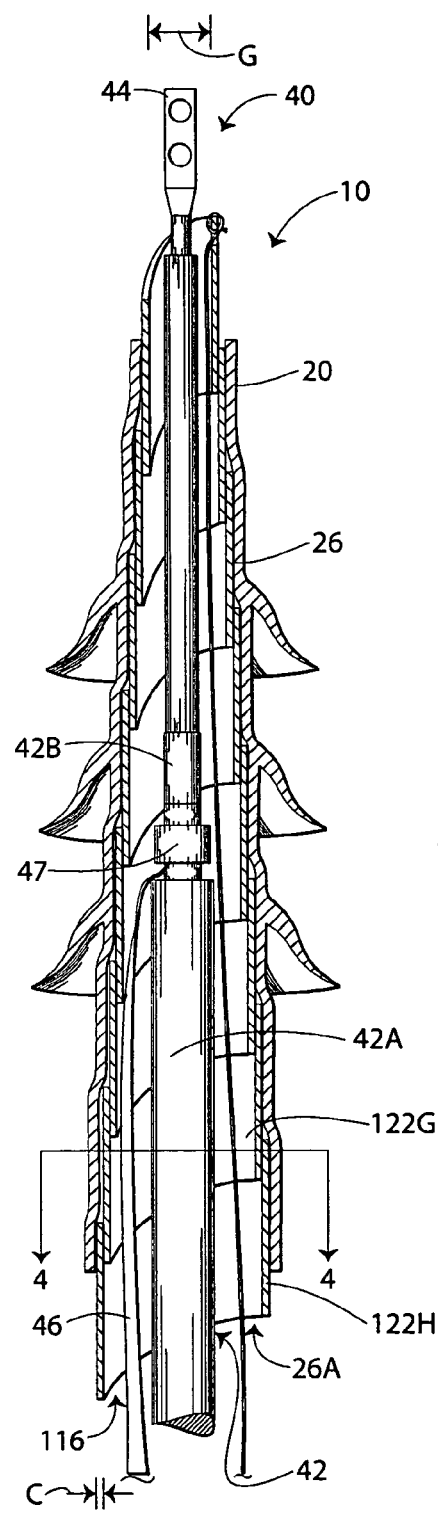
Fig. 3
Fig. 4
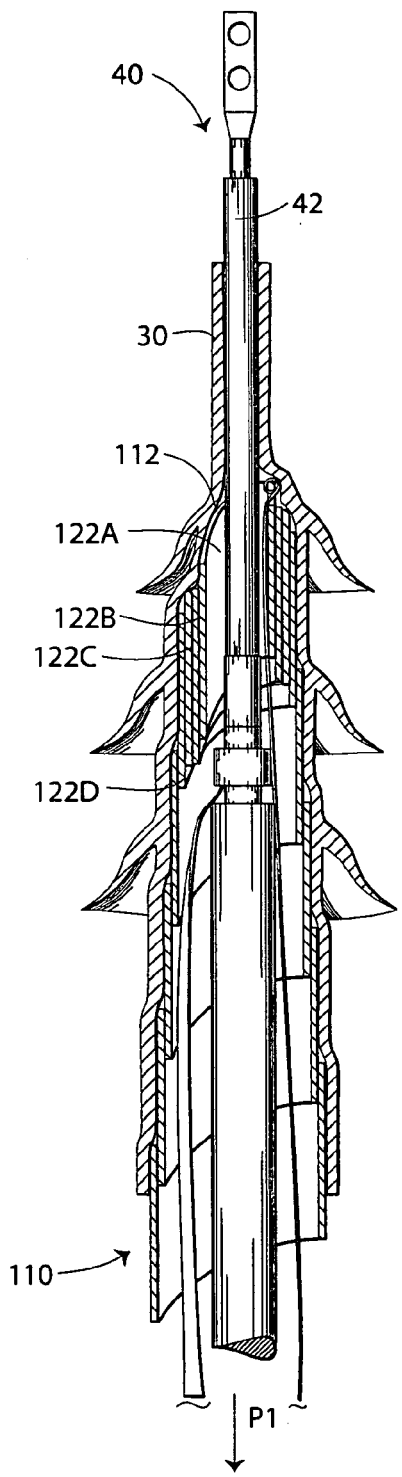
Fig. 5

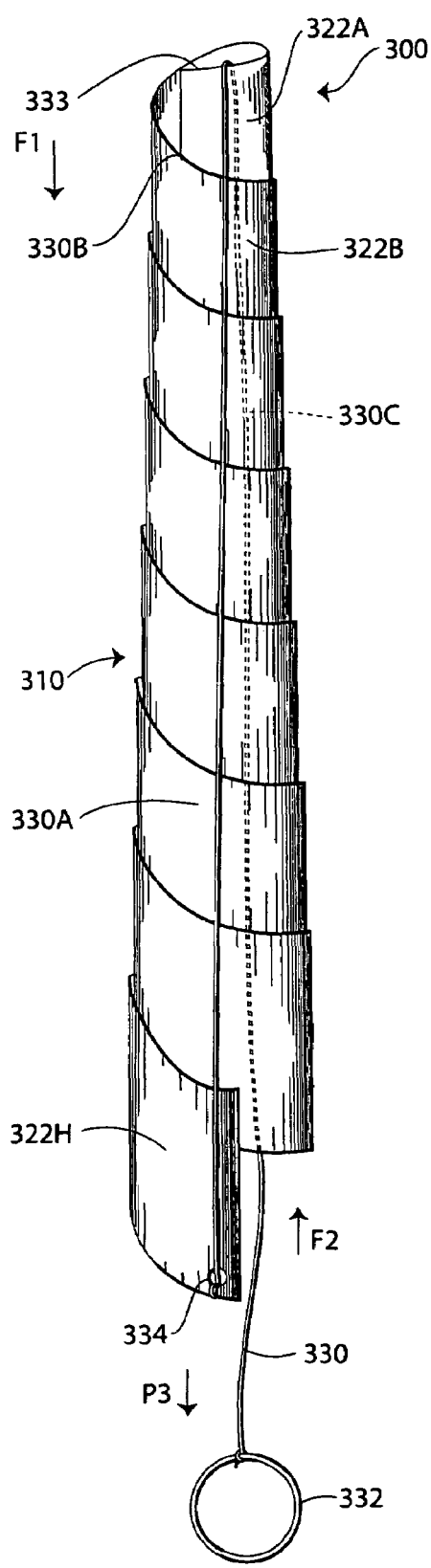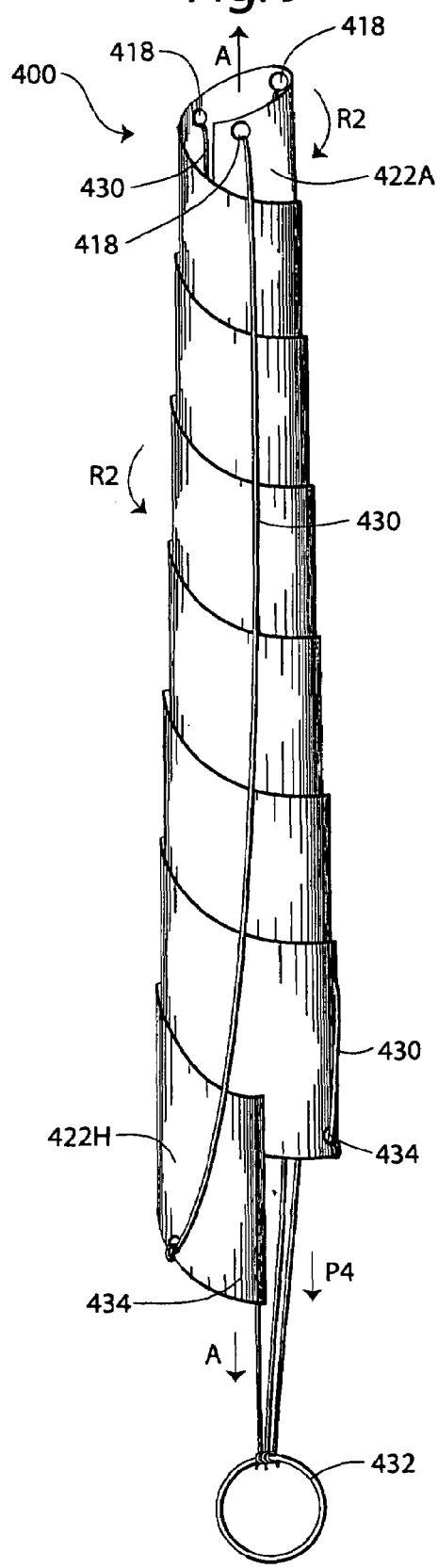

HOLDOUT DEVICES AND COVER ASSEMBLIES AND METHODS INCORPORATING THE SAME

FIELD OF THE INVENTION

The present invention relates to devices for applying a resilient sleeve onto an elongate substrate such as a cable and, more particularly, to holdout devices for applying a resilient sleeve onto an elongate substrate and cover assemblies and the methods incorporating holdout devices.

BACKGROUND OF THE INVENTION

Protective sleeves or covers are commonly installed on elongate substrates such as power distribution cables as well as other electrical cables. Such sleeves are commonly formed of an electrically insulative, polymeric material. Some known covers of this type are formed of a resilient, elastomeric material. In use, the sleeves are elastically stretched, placed about the substrate, and released, whereupon they recover to a reduced diameter to conform to or seal about the substrate. These sleeves may be referred to as cold-applied covers. It is generally necessary to expand the sleeve to a diameter sufficient to allow the sleeve to be slid onto the substrate. It is known to provide a holdout device or sleeve support in the sleeve to temporarily hold the sleeve in the expanded state. The holdout and the sleeve are slid over the substrate and the holdout is then removed to allow the sleeve to contract about the substrate. Known holdouts may suffer from various drawbacks.

SUMMARY OF THE INVENTION

According to embodiments of the present invention, a cover assembly for covering an elongate substrate includes a resilient sleeve member and a holdout device. The resilient sleeve member defines an axially extending inner passage. The holdout device includes a core mounted in the inner passage of the sleeve member. The core defines a core passage to receive the elongate substrate and has at least first and second sections. The first and second sections are arranged in a supporting position such that the core maintains the sleeve member in a radially expanded condition. The first and second sections are arranged for relative telescoping movement from the supporting position to a releasing position to permit at least a portion of the sleeve member to radially contract from the radially expanded position to a radially recovered position.

According to further embodiments of the present invention, a holdout device for applying a resilient sleeve member onto an elongate substrate, the sleeve member defining an axially extending inner passage, includes a core adapted to be mounted in the inner passage of the sleeve member. The core defines a core passage to receive the elongate substrate and has at least first and second sections. The first and second sections are arranged in a supporting position such that, when the core is mounted in the sleeve member, the core maintains the sleeve member in a radially expanded condition. The first and second sections are arranged for relative telescoping movement from the supporting position to a releasing position to permit at least a portion of the sleeve member to radially contract from the radially expanded position to a radially recovered position.

According to further embodiments of the present invention, a method for applying a resilient sleeve member onto an elongate substrate includes: mounting a core of a holdout device in an inner passage of the sleeve member, the core defining a core passage to receive the elongate substrate and having at least first and second sections, the first and second sections being arranged in a supporting position such that the core maintains the sleeve member in a radially expanded condition; mounting the core on the elongate substrate such that the elongate substrate is received in the core passage; and telescopingly moving the first and second sections relative to one another from the supporting position to a releasing position to permit at least a portion of the sleeve member to radially contract from the radially expanded position to a radially recovered position.

Further features, advantages and details of the present invention will be appreciated by those of ordinary skill in the art from a reading of the figures and the detailed description of the embodiments that follow, such description being merely illustrative of the present invention.

BRIEF DESCRIPTION OF THE DRAWINGS

FIG. 1 is a side view of a cover assembly according to embodiments of the present invention;

FIG. 2 is a side view of a holdout device forming a part of the cover assembly of FIG. 1;

FIG. 3 is a side, partial cross-sectional view of the cover assembly of FIG. 1 mounted on a cable;

FIG. 4 is a cross-sectional view of the cover assembly and the cable of FIG. 3 taken along the line 4-4 of FIG. 3;

FIG. 5 is a side, partial cross-sectional view of the cover assembly and the cable of FIG. 3, wherein a sleeve member of the cover assembly is partially installed on the cable;

FIG. 8 is a side view of a holdout device according to further embodiments of the present invention;

FIG. 9 is a side view of a holdout device according to further embodiments of the present invention;

DETAILED DESCRIPTION OF EMBODIMENTS OF THE INVENTION

Figure 6:
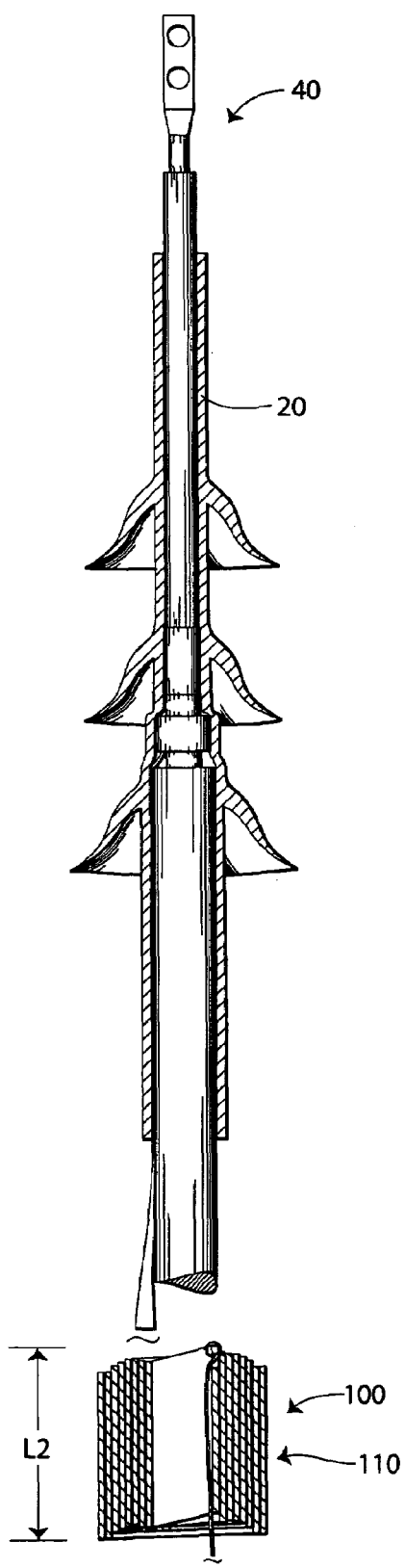
FIG. 6 is a side, partial cross-sectional view of the cover assembly and the cable of FIG. 3, wherein the sleeve member is fully installed on the cable.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a "first" element, component, region, layer or section discussed below could also be termed a "second" element, component, region, layer or section without departing from the teachings of the present invention. The sequence of operations (or steps) is not limited to the order presented in the claims or figures unless specifically indicated otherwise.

With reference to FIG. 1, a cover assembly 10 according to embodiments of the present invention is shown therein. The cover assembly 10 includes a sleeve member 20 and a holdout device 100 that supports the sleeve member 20 in an expanded condition. The cover assembly 10 may be used to install the sleeve member 20 over an elongated substrate such as a cable termination 40 (FIG. 3) or other cable assembly to protect the cable termination 40. As discussed in more detail below, the cover termination 10 may be slid over the cable assembly 40 and the holdout device 100 then removed to allow the sleeve member 20 to contract about the cable termination 40.

Turning to the sleeve member 20 in more detail, the sleeve member 20 may be referred to as a cold applied or cold shrinkable sleeve. The sleeve member 20 includes a body 21 having opposed ends 22 and 24. An inner surface 26 (FIG. 3) of the sleeve member 20 defines an inner passage 26A (FIG. 3). A plurality of sheds 28 extend radially outwardly from the body 21.

At least a portion of the body 21, and according to some embodiments substantially the entire body 21 is formed of a resilient, radially elastic material. That is, the body 21, can be stretched radially and to an expanded (i.e., radially enlarged) condition as shown in FIG. 1 and, upon release, will radially contract or recover to a partially or fully recovered condition having a smaller radius. The body 21 may be formed of any suitable material. According to some embodiments, the body 21 is formed of an elastomeric material. Suitable elastomeric materials include natural and synthetic polyisoprenes, polybutadiene, styrene-butadiene rubber (SBR), butadiene-acrylonitrile rubber, polychlorophrene (Neoprene), butyl rubber, polysulfide, silicone rubber, urethane rubber, polyacrylate, epichlorohydrin homo and copolymers, propylene oxide rubber, fluorosilicone rubber, fluorocarbon rubber, chlorosulfonated polyethylene, chlorinated polyethylene, ethylene-propylene rubber.

The holdout device 100 includes a core 110, a cord 130 and a handle 132. The core 110 is formed by a helical strip 120. The core 110 defines a longitudinal axis A-A and has a front or distal end 112 and a rear or proximal end 114. The core 110 defines an inner passage 116 (FIG. 3) extending from the end 112 to the end 114 and communicating with end openings 112A and 114A (FIG. 2) also defined by the core 110. A rear section 122H extends rearwardly beyond the rear end 24 of the sleeve member 20. According to some embodiments and as shown in FIG. 2, the core 110 is generally conical in shape.

The helical strip 120 (and, hence, the core 110) includes a plurality of sections 122A, 122B, 122C, 122D, 122E, 122F, 122G, 122H. The strip 120 is continuous such that the sections 122A-H are integral with one another. The strip 120 is helically wound such that the sections 122A-H each have a distal portion 124 that axially overlaps or covers a proximal portion of the adjacent section nearer the distal end 112. Thus, the sections 122A-H are helically and overlappingly wound or arranged. According to some embodiments, the core 110 includes at least four helically and overlappingly wound sections.

According to some embodiments, the overlap distance D (FIG. 2) between the adjacent sections 122A-H is between about 0.25 and 1 inch. According to some embodiments, the overlap distance D is between about 10 and 90% of the width B (FIG. 2) of the strip 120. According to some embodiments, the width B of the strip 120 is substantially uniform. According to some embodiments, the width B is between about 0.5 and 2 inches. According to some embodiments, the thickness C (FIG. 3) of the strip 120 is between about 0.005 and 0.04 inch.

The strip 120 may be formed of any suitable material. According to some embodiments, the strip 120 is formed of a polymeric material. According to some embodiments, the strip 120 is formed of polypropylene, ABS, or PVC. The inner surface and/or the outer surface of the strip 120 may be textured to reduce friction between interfacing portions of the strip 120 and/or between the core 110 and the inner surface of the sleeve member 20. Lubricant may be provided on the inner surface and/or the outer surface of the core 110 to reduce such friction.

The cord 130 is secured to the distalmost section 122A by an anchor end 134. For example, the cord 130 and the section 122A can be bonded, fastened, unitarily formed (e.g., unitarily molded), etc. The cord 130 extends rearwardly through the passage 116 and out through the opening 114A. The handle 132 is secured to the end of the cord 130 opposite the anchor end 134.

The cover assembly 10 can be formed by any suitable method. According to some embodiments, the strip 120 is formed as a continuous, flat strip and thereafter wound in helical, self-overlapping manner using a conical mandrel. According to some embodiments, the strip 120 (and thus the core 110) is integrally and unitarily formed. The core 110 is mounted in the inner passage 126A of the sleeve member 20 such that the sleeve member 20 is in a radially expanded condition or state as compared to its relaxed state and its intended installed state. For example, the core 110 can be installed in the sleeve member 20 by expanding the sleeve member 20, then inserting the core 110 in the passage 26A, and thereafter releasing the sleeve member 20 to contract onto the core 110. It will be appreciated that the holdout device 100 resists radial collapse of the core 110 and thereby serves as a supporting structure that resists radial contraction of the sleeve member 20. The cover assembly 10 may be stored, transported, etc. in this condition.

The cable termination 40 (FIG. 3) is merely exemplary and includes a cable 42, a terminal 44, a ground wire 46, and clamp ring 47. The cable 42 is prepared such that an end portion of a conductive shielding layer 42B thereof has been removed to provide a desired distance between the shielding layer 42B and the terminal 44. In order to remove the shielding layer portion, a portion of a jacket 42A of the cable 42 has also been removed. Thus, it may be desirable or necessary to apply an environmental protection cover such as the sleeve member 20 over the portion of the cable 42 extending from the end of the jacket 42A to the terminal 44.

To install the sleeve member 20 on the cable termination 40, the user first drops or slides the cover assembly 10 over the cable termination 40 as shown in FIG. 3. The cable termination is received in the inner passage 116. In the supporting position as shown in FIGS. 1-3, the nominal inner diameter G (FIG. 3) of the core 110 is sized to allow the core 110 to be slid over the cable assembly 40 without undue effort or damage to the cable assembly 40 (e.g., damage to the splice 44). The cover assembly 10 can be slid onto the cable termination 40 from either direction or with either end leading. According to some embodiments and as shown, the cover assembly is slid over the cable termination 40 from the terminal side and with the proximal end 114 leading.

The user then pulls the cord 130 (e.g., using the handle 132) in a pull direction P1, thereby forcing the section 122A in the pull direction P1. As a result, the section 122A telescopingly slides rearwardly into and relative to the section 122B as shown in FIG. 5. Thus, the core 110 telescopes inwardly to axially collapse (i.e., generally along the longitudinal axis A-A) the section 122A and/or the other portions of the strip 120 may simultaneously rotate in the direction R1 of the helix so that the core 110 radially collapses in controlled fashion adjacent the top end 112. According to some embodiments, the core 110 collapses axially in a substantially continuous, sequential manner so that the section 120A first telescopes into the section 122B, the section 122B next telescopes into the section 122C, and so forth. According to some embodiments, the sections 122A-H may relatively slide or telescope rearwardly into one another simultaneously or out of sequence.

As the core 110 is collapsed as described above, its effective length is reduced and, more particularly, the front end 112 is axially retracted relative to the sleeve member 20 into a releasing position. As a result, a section 30 of the sleeve member 20 is no longer supported in the expanded condition by the core 110 and is permitted to partially or fully recover to a radially recovered condition or position with a reduced diameter. The sleeve section 30 contracts about and conforms to the cable 42. The sleeve section 30 may thus form a seal with the cable 42. The user may then continue to pull the cord 130 to further telescopingly collapse the helical strip 120 until the end 112 is substantially free of the sleeve member 20, allowing the sleeve member 20 to attain a suitably radially recovered position from the end 22 to the end 24 as shown in FIG. 6. The core 110 can then be removed and discarded or otherwise disposed of. According to some embodiments, it is not necessary for the core 110 to be fully collapsed in order to fully release the sleeve member 20 from the core 110. In some cases, the sections 122A-H of the core 110 may not fully telescope as the cord is drawn, rather, the leading end of the strip 120 may unravel as it is drawn through and out of the passage 116.

According to some embodiments, the core 110 is adapted to telescope from an original length L1 (FIG. 2) to a fully collapsed length L2 (FIG. 5) a distance of at least 5 inches. According to some embodiments, the length L2 is no more than 10% of the length L1. According to some embodiments, the core 110 has an original length L1 of between about 10 and 15 inches.

According to some embodiments, the sleeve member 20 as mounted on the holdout device 100 in the undeployed cover assembly 10 is expanded at least about 200% of its relaxed diameter. According to some embodiments, the sleeve member 20 is expanded between about 200 and 350% as compared to a relaxed diameter. According to some embodiments, when the core 110 is in the supporting position, the core 110 has a nominal inner diameter of between about 1 and 3.5 inches.

Figure 7:
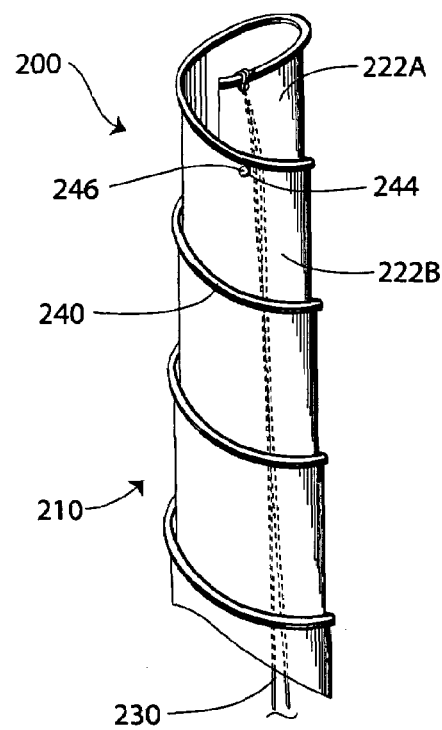
FIG. 7 is a side view of a holdout device according to further embodiments of the present invention.

With reference to FIG. 7, a holdout device 200 according to further embodiments of the present invention is shown therein. The holdout device 200 may be used in place of the holdout device 100 to form a cover assembly (not shown) which may be used in similar manner to the cover assembly 10 described above. The holdout device 200 is shown in its supporting position. The holdout device 200 may be formed in the same manner as the holdout device 100 except as follows. In the holdout device 200, a helically extending stop portion or flange 240 extends radially outwardly from the front or distal edge of the strip 220. Aligned holes 244 are formed in each of the sections 222A and 222B. A pin 246 extends through the holes 244 to resist relative axial sliding movement between the sections 222A and 222B.

The pin 246 serves to prevent inadvertent axial collapse of the core 210 of the holdout device 200 during shipping, storage, handling, installation, etc. When the user is ready to deploy the sleeve member from the holdout device 200, the user may remove the pin 246, thereby freeing the sections 222A and 222B for relative sliding movement. The user may then pull the cord 230 in the manner described above to telescopingly collapse the core 210 to its relaxing position. As the core 210 is collapsed, the portions of the flange 240 on the collapsing sections will engage the portions with the flange 240 on the sections below, thereby helping to ensure that the sections 222A, 222B, etc. collapse in a telescoping manner and do not become unraveled.

While a continuous flange 240 is described and shown, it will be appreciated that other configurations may be employed. For example, the flange 240 may be replaced with a plurality of spaced apart stops or protrusions.

With reference to FIG. 8, a holdout device 300 according to further embodiments of the present invention is shown therein. The holdout device 300 is shown in its supporting position. The holdout device 300 is formed in the same manner as the holdout device 100, except that the cord 330 is anchored at one end 334 to a proximal section 322H of the core 310 and includes a first cord segment 330A extending over the core 310 and a second cord segment 330C extending through the core passage and joined to the cord segment 330A by a bend or loop 330B over the distal edge 333 of the section 322A. The cord 330 may be pulled via the handle 332 in a pull direction P3, causing the cord 330 to bear on the edge 333 and force the sections 322A, 322B, etc. to axially collapse to its releasing position. Notably, the cord 330 so configured will exert both a rearward force F1 on the distal end of the core and a forward force F2 on the proximal end of the core 310, thereby helping to ensure that the core 310 collapses in telescoping fashion rather than becoming unraveled.

With reference to FIG. 9, a holdout device 400 according to further embodiments of the present invention is shown therein. The holdout device 500 is shown in its supporting position. The holdout device 400 may be used in place of the holdout device 100. The holdout device 400 may be formed in the same manner as the holdout device 300, except as follows. The holdout device 400 includes holes 418 defined in the section 422A and also includes multiple cords 430, which converge to a common pull handle 432. The cords 430 extend through the holes 418 instead of over the distal edge of the section 422A. The cords 430 are secured to the proximal section 422H at respective anchor points 434. The holes 418 and the anchor points 434 are circumferentially distributed such that, when the holdout device 400 is in the supporting position as shown in FIG. 9, each of the cords 430 extends at an angle relative to the longitudinal axis A-A. To transition the holdout device 400 to its releasing position, the user can pull the pull cord 435 in the pull direction P4, thereby drawing each of the plurality of cords 430. The rotation R2 of the helical strip 420 is facilitated by the angled arrangement of the cords 430.

Figure 10:
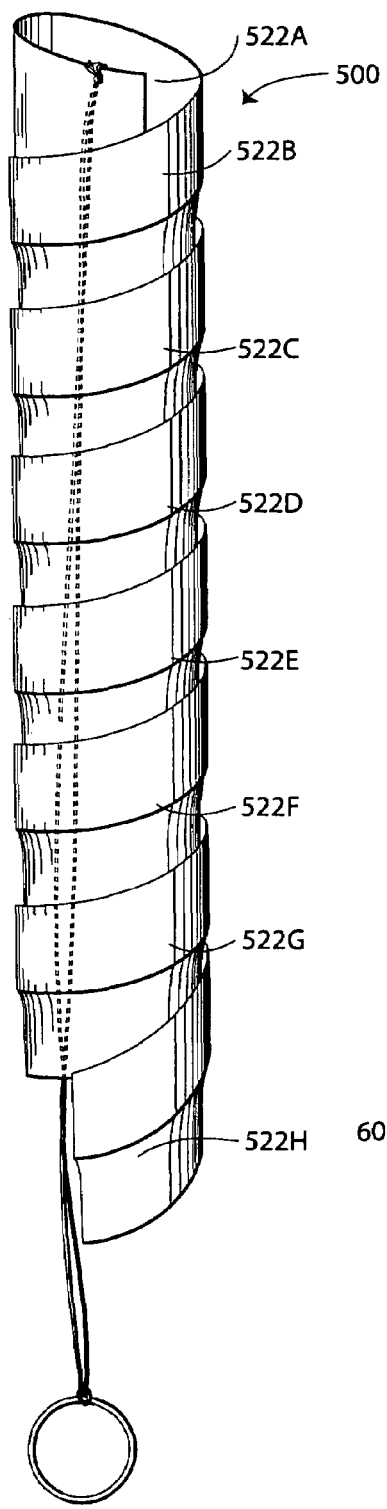
FIG. 10 is a side view of a holdout device according to further embodiments of the present invention.

With reference to FIG. 10, a holdout device 500 according to further embodiments of the present invention is shown therein. The holdout device 500 is shown in its supporting position. The holdout device 500 may be used in place of the holdout device 100. The holdout device 500 may be the same as the holdout device 100 except that the holdout device 500 is generally cylindrical so that the inner diameter defined by the sections 522A-H are substantially the same. The holdout device 500 may be formed by helically winding a strip as described above about a cylindrical mandrel. According to some embodiments, heat is applied to the strip while the strip is on the mandrel to ensure that the strip retains the cylindrical shape.

Figure 11:
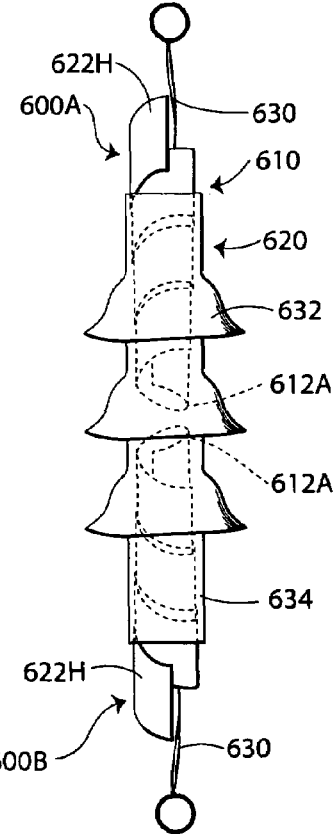
FIG. 11 is a side view of a cover assembly according to further embodiments of the present invention.

With reference to FIG. 11, a cover assembly 610 according to further embodiments of the present invention is shown therein. The cover assembly 610 includes a sleeve member 620 corresponding to the sleeve member 20. The sleeve member 620 includes first and second joined and opposed sections 632, 634. The cover assembly 610 includes a pair of holdout devices 600A and 600B that are mounted in the sleeve sections 632 and 634, respectively, such that their distal ends 612A are adjacent and, according to some embodiments, in abutment, and their end sections 622H extend outwardly from the open ends of the sleeve member 620. The sleeve member 620 may be applied to a cable assembly (e.g., a cable termination) or other elongate substrate by pulling the respective pull cords 630 to transition the holdout devices 600A, 600B to their releasing positions to deploy the sleeve member 620 in the same manner as described above with regard to the holdout device 100. It will be appreciated that by providing two holdout devices 600A, 600B, less axial telescoping collapse of each holdout device 600A, 600B is required.

Figure 12:
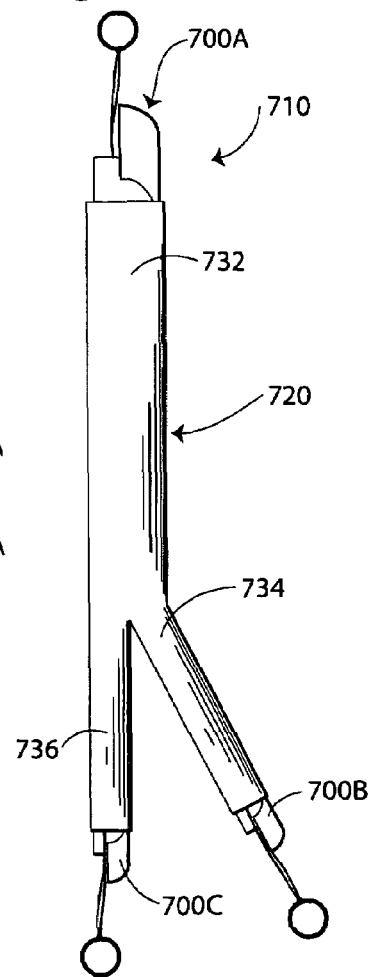
FIG. 12 is a side view of a cover assembly according to further embodiments of the present invention.

With reference to FIG. 12, a cover assembly 710 according to further embodiments of the present invention is shown therein. The cover assembly 710 includes an integral breakout boot or cover 720. The breakout cover 720 may be formed in the same manner as described above for the sleeve member 20, except that the breakout cover 720 includes three or more tubular sleeve sections 732, 734, 736. Respective holdout devices 700A, 700B, 700C corresponding to the holdout device 100 are positioned in each of the sleeve sections 732, 734, 736. The cover assembly 710 may be mounted on a breakout connection or cable breakout in substantially the same manner as described above with regard to the cover assembly 10.

According to further embodiments, the end 22 of the sleeve 20 may be closed to form a cap. In such case, the holdout device 100 would not extend past the sleeve end 22.

Various modifications may be made to the cover assemblies, sleeve members and holdout devices as described above. The various features of several embodiments may be combined. For example, the temporary holding pin 246 may be provided in the holdout devices 100, 300, 400, 500, 600A, 600B, 700A, 700B, and/or 700C. Any of the holdout devices 200, 300, 400, 500, may be used as the holdout devices 600A, 600B, 700A, 700B, 700C. While the sleeve members (including the breakout boot or cover 720) have been illustrated as tubes open at each end, sleeve members of other configurations may be used with the holdout devices and in the cover assemblies of the present invention. For example, the sleeve members may be resilient caps open on one end and closed on the other. It will be appreciated that the holdout devices may be used to temporarily support and selectively deploy sleeve members of various and any suitable designs.

While pull cords are disclosed herein for moving the holdout devices from the supporting position, other actuators may be used in accordance with embodiments of the invention. For example, a rigid or semi-rigid rod may be used in place of the pull cord.

Cover assemblies of the present invention may be used to environmentally protect medium voltage (e.g., 5,000-55,000 volt) cable assemblies.

The cover assemblies and holdout devices of the present invention may provide a number of advantages. The cover assemblies provide an effective mechanism for applying a cold-applied or cold shrinkable cover onto an elongate substrate such as a cable or cable termination. The holdout devices may present reduced waste and be cost effective to manufacture. The holdout devices may provide improved reliability and convenience as compared to other holdout devices. The holdout devices of the present invention may be used to effectively install a sleeve member on an elongate substrate with little or no wrinkling of the sleeve member.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A cover assembly for covering an elongate substrate, the cover assembly comprising:
a resilient sleeve member defining an axially extending inner passage; and
a holdout device including a core mounted in the inner passage of the sleeve member, the core defining a core passage to receive the elongate substrate and having at least first and second sections, the first and second sections being arranged in a supporting position such that the core maintains the sleeve member in a radially expanded condition, wherein the first and second sections are arranged for relative telescoping movement from the supporting position to a releasing position to permit at least a portion of the sleeve member to radially contract from the radially expanded position to a radially recovered position;
wherein the first and second sections are arranged to slide relative to one another from the supporting position to the releasing position.

2. The cover assembly of claim 1 wherein the first and second sections are arranged to relatively axially collapse from the supporting position to the releasing position.

3. The cover assembly of claim 1 wherein the first and second sections are integral with one another.

4. The cover assembly of claim 1 wherein the first and second sections are unitarily formed.

5. The cover assembly of claim 1 wherein the first and second sections overlap in the supporting position.

6. The cover assembly of claim 5 wherein the core comprises a helically wound and self-overlapping strip including the first and second sections.

7. The cover assembly of claim 1 wherein the holdout device includes an actuator accessible by a user to transition the first and second sections from the supporting position to the releasing position.

8. The cover assembly of claim 1 wherein the actuator includes a pull cord.

9. The cover assembly of claim 8 wherein:
the core has a distal end and a proximal end and the core passage extends between the distal and proximal ends; and
the pull cord is attached at the distal end, extends through the core passage, and is adapted to be drawn in a direction from the distal end to the proximal end to transition the first and second sections from the supporting position to the releasing position.

10. The cover assembly of claim 8 wherein:
the core has a distal end and a proximal end;
the first section is located at the distal end of the core; and
the pull cord slidably engages the first section to draw or push the first section in a direction from the distal end to the proximal end to transition the first and second sections from the supporting position to the releasing position.

11. The cover assembly of claim 8 wherein the pull cord includes a plurality of cord segments adapted to distribute a pull force about the core.

12. The cover assembly of claim 11 wherein the plurality of cord segments are configured to control a rotation of the core as the first and second sections are transitioned from the supporting position to the releasing position.

13. The cover assembly of claim 1 including a stop portion extending radially from the second section and adapted to engage the first section to limit the relative telescoping movement therebetween.

14. The cover assembly of claim 1 wherein the core passage is generally cylindrical.

15. The cover assembly of claim 1 including a second said holdout device including a second core mounted in the inner passage of the sleeve member.

16. The cover assembly of claim 1 wherein the sleeve member is a breakout cover further defining second and third inner passages, the cover assembly further including a second said holdout device having a second core mounted in the second inner passage and a third said holdout device having a third core mounted in the third inner passage of the sleeve member.

17. The cover assembly of claim 1 wherein the sleeve member is closed on one end to form a cap.

18. The cover assembly of claim 1 wherein the core is generally conical.

19. The cover assembly of claim 1 wherein the core radially collapses from the supporting position to the releasing position.

20. The cover assembly of claim 1 wherein the core has a first axial length when in the supporting position and a second axial length when in the releasing position, and the second axial length is less than the first axial length.

21. The cover assembly of claim 20 wherein the second axial length is no more than 10% of the first axial length.

22. The cover assembly of claim 1 wherein the first and second sections are arranged to slide axially against one another from the supporting position to the releasing position.

23. The cover assembly of claim 1 wherein the first and second sections are arranged such that the first section slides into the second section from the supporting position to the releasing position.

24. The cover assembly of claim 23 wherein the first and second sections are each generally conical or cylindrical in each of the supporting position and the releasing position.

25. The cover assembly of claim 23 wherein the holdout device includes a third section arranged such that the first and second sections slide into the third section from the supporting position to the releasing position.

26. The cover assembly of claim 25 wherein the first, second and third sections are each generally conical or cylindrical in each of the supporting position and the releasing position.

27. The cover assembly of claim 6 wherein the first and second sections axially overlap a distance of between about 0.25 and 1 inch.

28. The cover assembly of claim 6 wherein, as the first and second sections transition from the supporting position to the releasing position, the first and second sections rotate in the direction of the helical winding.

* * * * *